Oct. 9, 1928.  1,687,166
R. L. LITTLE
CANOPY FOR CEILING FIXTURES
Filed Sept. 29, 1927

Inventor:
Robert L. Little

Patented Oct. 9, 1928.

1,687,166

UNITED STATES PATENT OFFICE.

ROBERT L. LITTLE, OF CHICAGO, ILLINOIS, ASSIGNOR TO LINDSAY LIGHT COMPANY, OF CHICAGO, ILLINOIS, A CORPORATION OF ILLINOIS.

CANOPY FOR CEILING FIXTURES.

Application filed September 29, 1927. Serial No. 222,769.

This invention relates to canopies for ceiling fixtures and the like and is an improvement of my application Serial No. 187,017, filed April 27, 1927.

An object of the invention is to provide a more efficient means for lowering the canopy, which is used particularly on ceiling fixtures while connecting the wiring sections or while inspecting or making repairs thereon.

Another object is to simplify the whole construction as far as possible.

These and other objects which will hereinafter appear are accomplished by this invention which is fully described in the following specification and shown in the accompanying drawings, in which.

Figure 1:
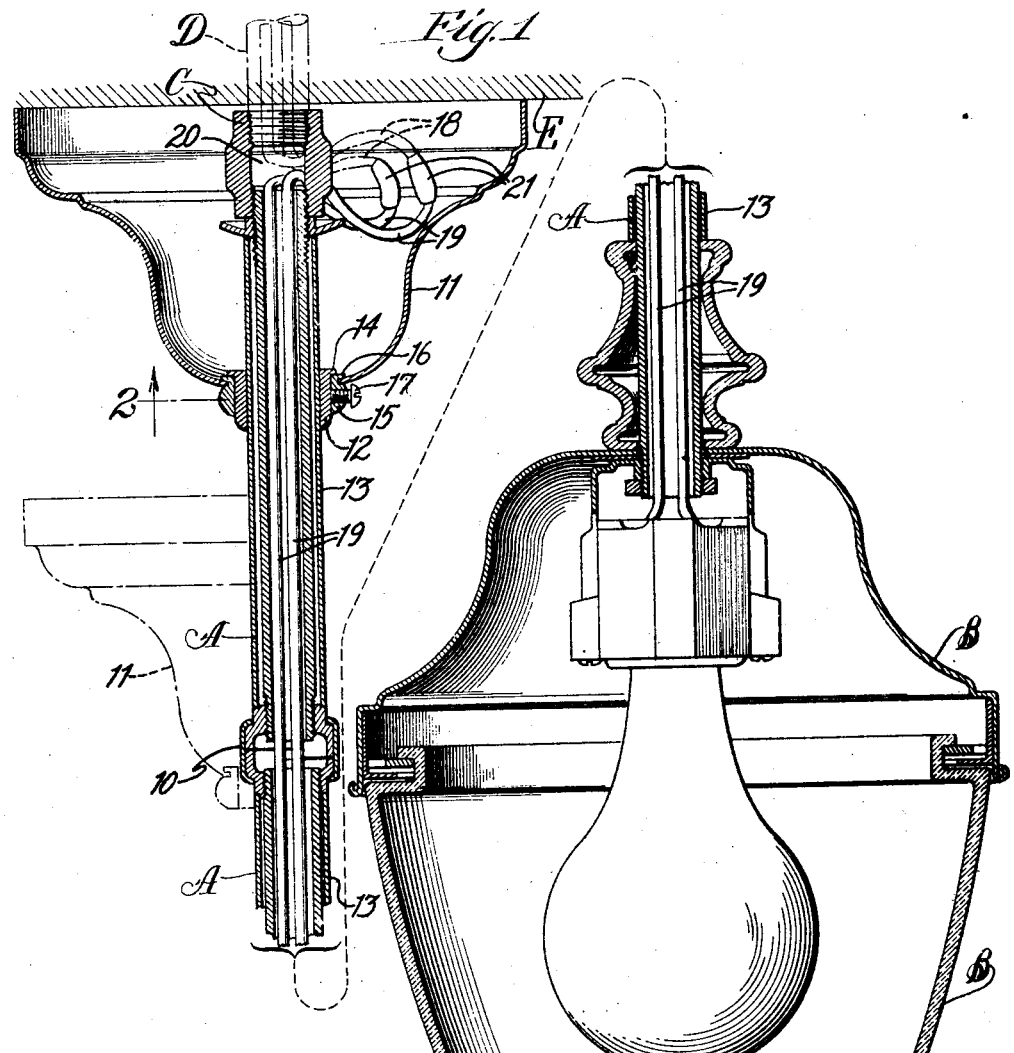
Figure 1 is a broken vertical sectional view through the device.
Figure 2:
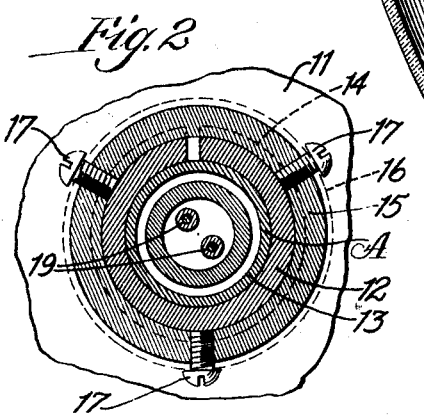
Fig. 2 is an enlarged section on the line 2 of Fig. 1.

The embodiment illustrated comprises a central tube designated generally as A which carries at its lower end a lamp B and at its upper end a coupling C which is screw-threaded to receive the pipe D which extends through the ceiling E.

The central tube A need not be described in detail as it is not a part of the present invention, but one of its features is a flexible coupling 10 which is preferably somewhat larger in diameter than the main body of the tube A. This coupling permits of a certain amount of flexibility between the two sections of the tube A which serves to prevent much of the vibration received from the upper section being transmitted to the lower section and consequently prevents much of this vibration being transmitted to the filament of the lamp itself. This flexible coupling also permits the lower section of the tube and the lamp itself to hang vertical even though the pipe D is somewhat out of vertical alignment.

The present invention relates to the method of mounting the canopy 11 which surrounds the central tube A. This mounting consists of a split sleeve 12 which loosely surrounds the upper tube section 13, but which is preferably fitted sufficiently tightly thereon to hold it against the weight of the sleeve itself by friction. This sleeve has a small flange 14 at the upper portion, the purpose of which will presently appear.

A ring 15 is fitted within the opening within the lower portion of the urn-like canopy 11, and has a flange 16 which is rolled tightly in place so as to secure it thereon. The ring 15 is slidable over the lower portion of the sleeve 12 and is prevented from passing over it by the flange 14. The ring 15 is provided with one or more screws 17 which are adapted to press in upon the sleeve 12 and to serve the double purpose of securing the canopy 11 on the sleeve 12 and also of compressing the sleeve 12 on the tube section 13 so as to lock it in place at the desired height thereon.

The ring 15 is made large enough to permit it to pass over the coupling 10 so that in putting up this lighting fixture the operator loosens one or more of the screws 17 so that the canopy 11 and ring 15 may be slid down off the sleeve 12 and, since the ring 15 is larger than the coupling 10, it passes over it as shown in dotted lines so that the canopy 11 is entirely out of the way of the operator.

The electric light leads 18 and 19 may now be brought through the opening 20 in the sides of the fitting C and spliced as shown at 21.

During this operation the canopy 11 is lowered to a point where it is completely out of the way of the operator so that it does not interfere with him in any way. After the splices are made, the canopy 11 is raised and the ring 15 slid over the sleeve 12 and the whole slid up along the tube section 16 until the top of the canopy rests against the ceiling E.

It will be understood that while this is described as a ceiling fixture, it can also be used as a wall fixture and that the enlargement 10 may be any enlargement on the tube and not necessarily a flexible coupling.

While I have shown and described but a single embodiment of this invention, it is to be understood that it is capable of many modifications. Changes therefore in the construction and arrangement may be made which do not depart from the spirit and scope of the invention as disclosed in the appended claims.

I claim:

1. In a ceiling fixture, a tube, a sleeve slidable on the tube, a rim on the inside of said sleeve to prevent the withdrawal of said canopy, an enlargement on the tube below the sleeve, and a canopy having an opening adapted to fit over said sleeve and to pass over said enlargement.

2. In a ceiling fixture, a tube, a sleeve slidable on the tube, an enlargement on the tube below the sleeve, a canopy having an opening adapted to fit over said sleeve and to pass over said enlargement, and means for simultaneously securing said canopy on said sleeve and said sleeve on said tube.

3. In a ceiling fixture, a tube, a split sleeve slidable on the tube, an enlargement on the tube below the sleeve, a canopy having an opening adapted to fit over said sleeve and to pass over said enlargement, and a screw in said canopy adapted to bear upon said sleeve to secure both the canopy and the sleeve in adjusted position on said tube.

4. In a ceiling fixture, a tube, a split sleeve slidable on the tube, an enlargement on the tube below the sleeve, a canopy having an opening adapted to fit over said sleeve, a ring in said opening adapted to fit over said sleeve, and a screw in said ring for securing said canopy and sleeve on said tube.

In testimony whereof I have hereunto set my hand this 20th day of September, 1927.

ROBERT L. LITTLE.